United States Patent
Sommier et al.

(10) Patent No.: US 12,355,180 B2
(45) Date of Patent: Jul. 8, 2025

(54) PROTECTIVE COVER

(71) Applicant: FAURECIA SYSTEMES D'ECHAPPEMENT, Nanterre (FR)

(72) Inventors: Thomas Sommier, Belfort (FR); David Zahnd, Vandoncourt (FR)

(73) Assignee: FAURECIA SYSTEMES D'ECHAPPEMENT, Nanterre (FR)

( * ) Notice: Subject to any disclaimer, the term of this patent is extended or adjusted under 35 U.S.C. 154(b) by 417 days.

(21) Appl. No.: 17/990,839

(22) Filed: Nov. 21, 2022

(65) Prior Publication Data

US 2023/0163515 A1    May 25, 2023

(30) Foreign Application Priority Data

Nov. 23, 2021   (FR) .................................... 21 12403

(51) Int. Cl.
*H01R 13/44*      (2006.01)
*H01R 13/52*      (2006.01)
*H02G 3/04*       (2006.01)

(52) U.S. Cl.
CPC ......... *H01R 13/5213* (2013.01); *H01R 13/44* (2013.01); *H02G 3/0406* (2013.01)

(58) Field of Classification Search
None
See application file for complete search history.

(56) References Cited

U.S. PATENT DOCUMENTS

| | | | | |
|---|---|---|---|---|
| 4,676,569 A * | 6/1987 | Lambert | ............ | H01R 13/5213 |
| | | | | 439/892 |
| 9,511,725 B2 * | 12/2016 | Nagayasu | ........... | B60R 16/0215 |

FOREIGN PATENT DOCUMENTS

| | | | | |
|---|---|---|---|---|
| DE | 112013003677 T5 * | 4/2015 | ........ | B60R 16/0215 |
| JP | 2008195182 A | 8/2008 | | |
| JP | 6681417 B2 | 4/2020 | | |
| WO | 2014017545 A1 | 8/2008 | | |
| WO | 2016075839 A1 | 5/2016 | | |

OTHER PUBLICATIONS

French Preliminary Search Report for Application No. 21 12403 dated Jun. 29, 2022.

* cited by examiner

*Primary Examiner* — Tho D Ta
(74) *Attorney, Agent, or Firm* — Carlson, Gaskey & Olds, P.C.

(57) ABSTRACT

A protective cover for an electrical conductor comprises a substantially tubular cap surrounding the electrical conductor. The protective cover further includes a substantially disc-shaped flange comprising a bore surrounding the electrical conductor in a liquid-tight manner and an outer contour strictly inscribed in an inner contour of the tubular cap facing disc-shaped flange. The tubular cap also comprises at least one perforation arranged at a low point of the tubular cap. In one example, the protective cover is used for a heating element for an exhaust line.

15 Claims, 4 Drawing Sheets

PROTECTIVE COVER

CROSS-REFERENCE TO RELATED APPLICATION

This application is a U.S. non-provisional application claiming the benefit of French Application No. 21 12403, filed on Nov. 23, 2021, which is incorporated herein by reference in its entirety.

TECHNICAL FIELD

The disclosure relates to a protective cover for an electrical conductor.

BACKGROUND

It is known to make a protective cover for an electrical conductor comprising a substantially tubular cover surrounding the conductor. It is assumed that the connection to a complementary conductor is made through the downstream end of the conductor and that the conductor is connected to a cable through its upstream end.

It is advantageous, and in some cases necessary, to protect at least part of the contents of the cover from contact with liquids, such as an electrical insulator arranged in the area of contact of the conductor with the complementary conductor, located downstream of the cover.

A seal between the cap at its upstream end and the cable is possible and recommended. However, it cannot be totally effective in all configurations.

A known solution, in the field of transportation, called the flow loop, consists in orienting the cover so that its upstream end faces downwards and in shaping the cable according to a loop, so that a liquid flowing along the cable meets a low point in the loop before reaching the conductor. The presence of a rising portion of the cable as it approaches the conductor prevents water from flowing into the cap.

This classical solution is not always possible, especially when integration becomes constrained in restricted spaces.

SUMMARY

A protective cover is provided that allows a cap and cable to be arranged in any orientation, including such that an upstream end faces upward, with the cable descending toward the cap.

Thus, the disclosure provides an advantageous solution.

In one example, the disclosure comprises a protective cover, for protecting an area to be protected against liquids, comprising an electrical conductor and a substantially tubular cap surrounding the electrical conductor and the area to be protected against liquids. The substantially tubular cap comprises at least one perforation located at a low point, and the protective cover further comprises at least one deflector capable of diverting a liquid approaching the area to be protected against liquids towards the at least one perforation.

Particular features or embodiments, which may be used alone or in combination, are:
the electrical conductor comprises a downstream branch, capable of being connected by its distal/downstream end to a complementary conductor, and an upstream branch, connected to the downstream branch by its proximal end and connected by its distal/upstream end to a cable, and the substantially tubular cap comprises a downstream tube substantially coaxial with the downstream branch and an upstream tube substantially coaxial with the upstream branch and connected with the downstream tube,
the area to be protected against liquids comprises an electrical insulator arranged between the electrical conductor and a complementary conductor, preferably between the downstream branch of the electrical conductor and the complementary conductor,
said at least one deflector comprises a deflector body, arranged on the inner wall of the substantially tubular cap, on a side of the area to be protected against liquids,
said at least one deflector also comprises a flange surrounding the electrical conductor,
the flange is arranged on the downstream branch, preferably outside a gravity projection of the upstream tube,
the deflector body is arranged on the upstream tube or substantially at the intersection between the upstream tube and the downstream tube,
the deflector body is sized so that its distal end projects, under gravity, on the upstream side of the flange,
said at least one perforation is protected by a baffle so as to oppose liquid entry from outside the substantially tubular cap,
the protective cover further comprises a second flange, surrounding the complementary conductor,
the protective cover also comprises a second deflector body arranged on the inner wall of the cap, preferably downstream of the second flange.

In a second aspect of the disclosure, an electrical heating element for an exhaust line has at least one connection of one of its electrodes is protected by such a protective cover.

BRIEF DESCRIPTION OF THE DRAWINGS

The disclosure will be better understood from the following description, made only by way of example, and with reference to the appended figures in which.

DETAILED DESCRIPTION

Figure 1:
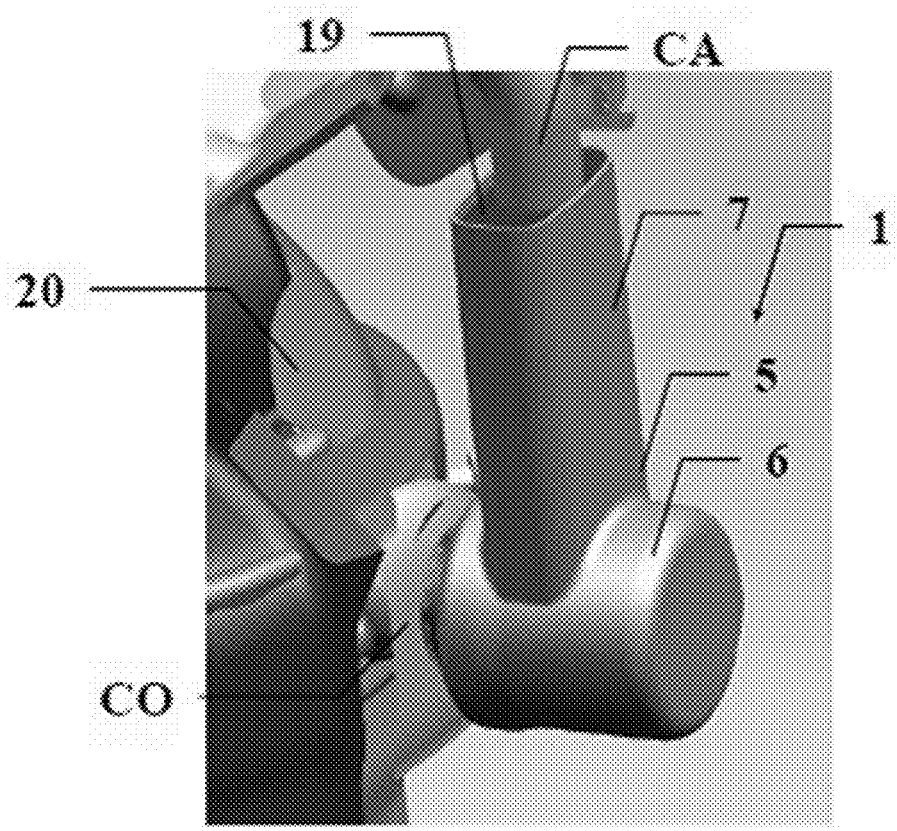
FIG. 1 shows, in perspective view, a protective cover according to the disclosure.

With reference to FIG. 1, the disclosure relates to a protective cover 1. It is intended to protect an area to be protected against liquids.

There is a concern of liquid flowing into the area to be protected. The direction of flow of a liquid makes it possible to define an upstream and a downstream.

To achieve its function, the protective cover 1 comprises a substantially tubular cap 5 and an electrical conductor 2 arranged in the hollow of the tube formed by the cap 5. Despite a seal at the upstream end designed to prevent the introduction of liquid into the cap 5, it is possible for a liquid to penetrate the cap 5. It is desirable to prevent this liquid from reaching an area to be protected 18, located at the downstream end of the cap 5, and particularly the area in which the conductor 2 is in contact with the complementary conductor CO, this area to be protected 18 including an electrical insulator 21, for example made of ceramic, which could be damaged by contact with a liquid or create a possible path for the current, also known as leakage current, thus degrading the electrical insulation performance of the complementary conductor CO.

To this end, the protective cover 1 comprises at least one deflector 10, 14 for the liquid, so that it does not reach the area to be protected 18, and at least one perforation 8, arranged in a lower area of the cap 5, allowing the liquid to exit the cap 5, mainly by gravity. The deflector 10, 14 is shaped to divert a liquid that tries to approach the area to be protected 18. The deflector guides the liquid towards said at least one perforation 8 or allows gravity to perform this guidance.

According to another feature, the area to be protected 18 comprises an electrical insulator 21, arranged between the electrical conductor 2 and a complementary conductor CO.

According to another feature, said at least one deflector 10, 14 comprises a deflector body 14. This deflector body 14 is arranged on the inner wall of the cap 5. It tends to divert a flow of liquid flowing along said wall, towards the axis of the cap 5, where the electrical conductor 2 is located.

According to another feature, said at least one deflector 10, 14 comprises a flange 10. This flange 10 surrounds the electrical conductor 2. It thus prevents the flow of liquid along the conductor 2, potentially to the area to be protected 18. According to one embodiment, the flange 10 is substantially discoidal. A flow of liquid along the conductor 2 from upstream cannot pass the flange 10 and reach the area to be protected 18, located downstream of the flange 10.

A flow of liquid can occur, following an entry of the liquid from the upstream end, along the inner wall of the cap 5. The purpose of the deflector body 14 is to divert a wall flow towards the center, toward the conductor 2.

A flow of liquid may still occur as a result of liquid entering from the upstream end along the cable CA and thus along the conductor 2. The purpose of the flange 10 is to stop a flow along the conductor 2.

According to one possible embodiment, the conductor 2 comprises a downstream branch 3 and an upstream branch 4. The figures illustrate a monopolar conductor 2. A branch 3, 4 is preferably substantially straight. The cross-section of a branch 3, 4 can be any shape, preferably circular. It can vary from one branch to another. It can even vary along the length of a branch. The downstream branch 3, shown horizontally in the figures, can be connected to a complementary conductor CO by its distal end, namely the most downstream end. This connection is typically made by insertion, possibly with a deformable element exerting a return force, typically radial. The upstream branch 4, shown vertically in the figures, is connected to the downstream branch 3 by their proximal ends, namely, the ends closest to the center of the cap 5.

The two branches 3, 4 can be assembled substantially perpendicular to each other. They can also be made of material by bending an initially straight bar. The upstream branch 4 is connected to a cable CA by its distal end, namely the most upstream end.

According to one possible embodiment, the cap 5 is shaped according to a downstream tube 6 and an upstream tube 7. The cross-section of a tube 6, 7 can be any shape, it can be polygonal, hexagonal, rectangular, square, with rounded edges, elliptical, or even preferentially circular. It can vary from one tube to another. It can even vary along the length of a tube. The downstream tube 6 is arranged substantially coaxial to the downstream branch 3, which it surrounds over its entire periphery. The upstream tube 7 is arranged substantially coaxial to the upstream branch 4, which it surrounds over its entire periphery. The downstream tube 6 is connected with the upstream tube 7 in a closed manner, in order to provide a substantially tight protection inside the cap 5.

The cap 5, formed by the two tubes 6, 7 is shaped to be substantially liquid-tight. The interface between the downstream branch 3, the downstream tube 6 and the complementary conductor CO provides a liquid-tight seal, when connected.

Sealing at the upstream branch 4 and the upstream tube 7 is more problematic. It is known that a gasket 19 can be used to ensure a seal between the cable CA and the distal end of the upstream tube 7. However, such a gasket 19 is not always sufficient to ensure a liquid-tight seal. The prior art solution to this problem is to arrange the upstream tube 7 facing downward. The disclosure, on the other hand, proposes a connector that allows the upstream tube 7 to be oriented upward.

In this case, despite the seal/gasket 19, it is possible to observe liquid inlets, as shown by the arrows. A first liquid entry is possible at the interface between the seal 19 and the cable CA. It then flows along the upstream branch 4, then possibly, along the downstream branch 3. A second liquid inlet is possible at the interface between the seal 19 and the inner wall of the second tube 7. It then flows along the inner wall of the second tube 7.

It is important to protect the distal end of the downstream branch 3 from liquids, and in particular an electrical insulator 21 arranged at the interface between the downstream end of the conductor 2 and the complementary conductor CO. This electrical insulator 21 is made of a material able to withstand very high temperatures, typically a ceramic. However, this material would be damaged, or its electrical insulation performance would be degraded, by contact with a liquid.

Figure 2:
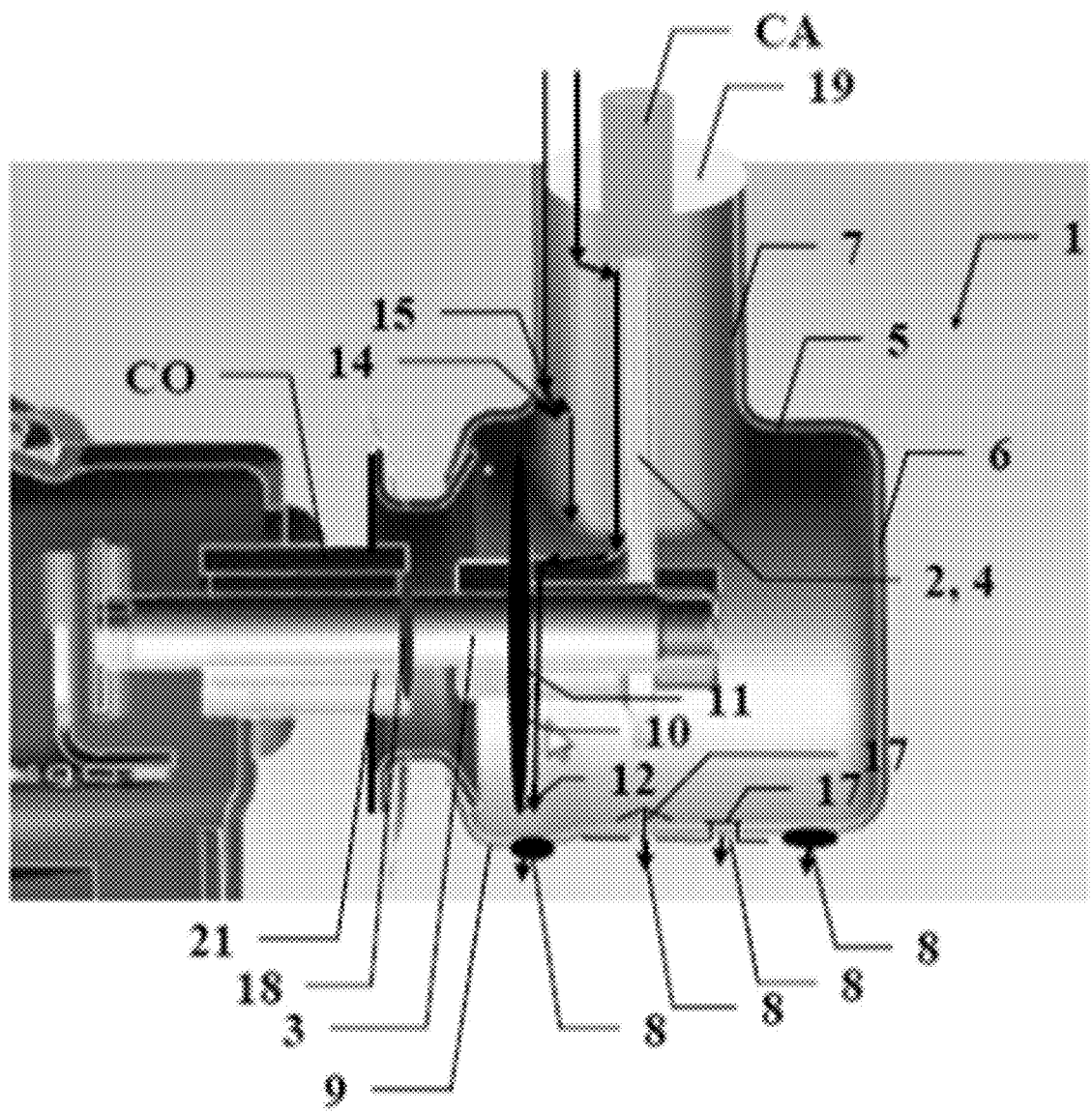
FIG. 2 shows, in sectional view, another protective cover according to the disclosure.

According to another advantageous feature, the flange 10 is arranged outside the vertical or gravity projection of the second tube 7. By projection is meant the volume framed by the second tube 7 itself and its extension parallel to a vertical line, which a falling liquid would follow. Thus, as can be seen in FIG. 2, a flow of liquid on the inner wall of the upstream tube 7, when it reaches the end of its course, falls down onto the upstream side of the flange 10. Also, a second function of the flange 10 is to direct any liquid flowing from the inner wall of the upstream tube 7 toward the upstream side. Here, this is liquid coming from the second inlet.

A tapered profile of the flange 10 is advantageous here, in that it collects a more distant drop to guide it toward the upstream side.

As more particularly visible in FIG. 2, the deflector body 14 allows a flow of liquid to be forced along the inner wall of the second tube 7 toward the upstream side. The deflector body 14 allows the point of projection of the upstream tube 7 where the wall flow breaks off to drip toward the downstream branch 3 to be moved toward the upstream side. The deflector body 14 can thus even allow the flange 10 to be arranged slightly inside the initial projection, without deflector, of the upstream tube 7.

The combination of the deflector body 14 and the flange 10 even forms a baffle, preventing the passage of a liquid from the upstream side to the area to be protected 18 located downstream of the downstream branch 3.

The deflector body 14 is advantageously oriented so as to break a wall flow while diverting it as much as possible toward the inside of the projection of the upstream tube 7, namely toward the upstream side of the flange 10.

According to another feature, the deflector body 14, in its width extending from the tubes 6, 7, presents an extension such that its distal end 15 projects, parallel to the vertical, on the upstream side of the flange 10. As already described, the deflector body 14 makes it possible to displace, toward the inner side, the point of projection of the upstream tube 7 where the wall flow breaks up to drain toward the downstream branch 3.

The person skilled in the art understands that, given the impossibility of making the entire interior of the cap 5 liquid-tight, any liquid that may enter the housing 5 is contained outside the part that it is desired to protect: the distal end of the downstream branch 3 and the insulator 18. Thus, this liquid is contained on the upstream side of the flange 10.

A liquid which meets the flange 10, either by following the downstream branch 3, or coming from the internal wall of the upstream tube 7, then runs along the lower part of the flange 10 to end up, due to gravity in the bottom of the cap 5, at a low point. Likewise, liquid can gravitate to the bottom of the cap 5 along either wall.

In order not to let this liquid accumulate in the cap 5, the cap 5 also comprises at least one perforation 8 to allow a gravity drainage. Such at least one perforation 8 is advantageously pierced in the downstream tube 6, in the lower wall, that is, the wall opposite the upstream tube 7, when the upstream tube 7 faces upwards and still advantageously at the lowest point(s).

According to another feature, said at least one perforation 8 is protected by a baffle 17. Such a baffle 17 is shaped and arranged opposite the perforation 8 so as to oppose an entry of liquid from the outside of the cap 5, while allowing a flow of liquid contained in the cap 5 toward the outside.

Figure 3:
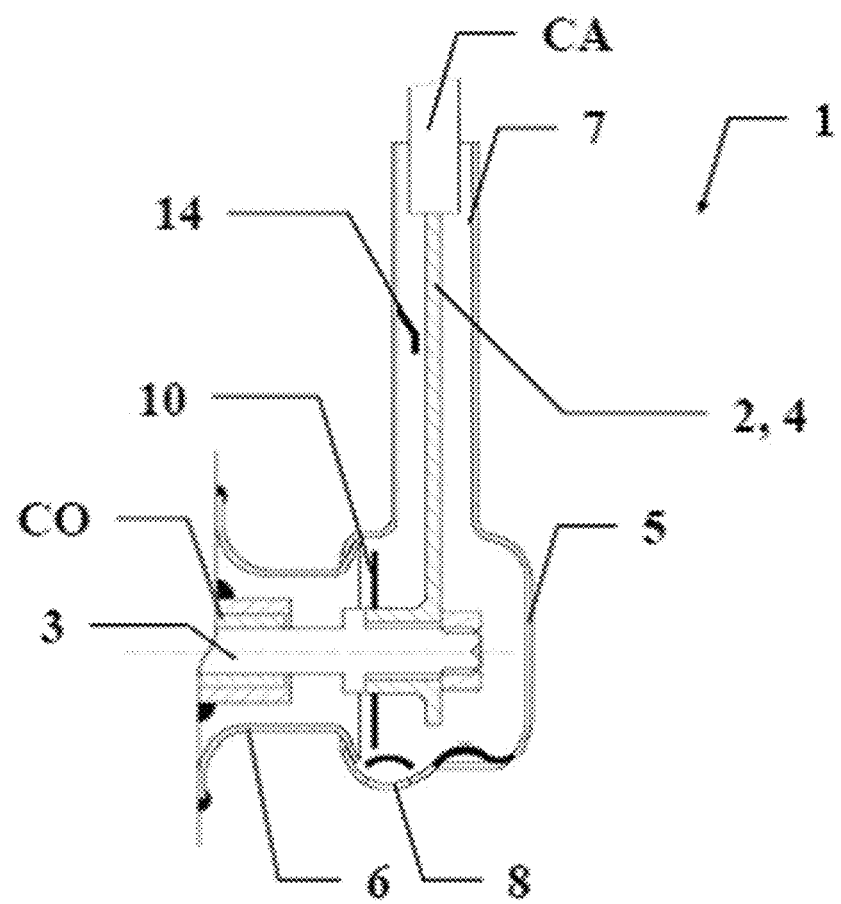
FIG. 3 shows, in sectional view, another protective cover according to the disclosure.

According to a first embodiment, it is assumed that the downstream end of the cap 5, where the conductor 2 interfaces with the complementary conductor CO, is sealed by a connection of the downstream end of the cap 5 with a complementary portion surrounding the complementary conductor CO. This is illustrated in FIGS. 2 and 3.

Figure 4:
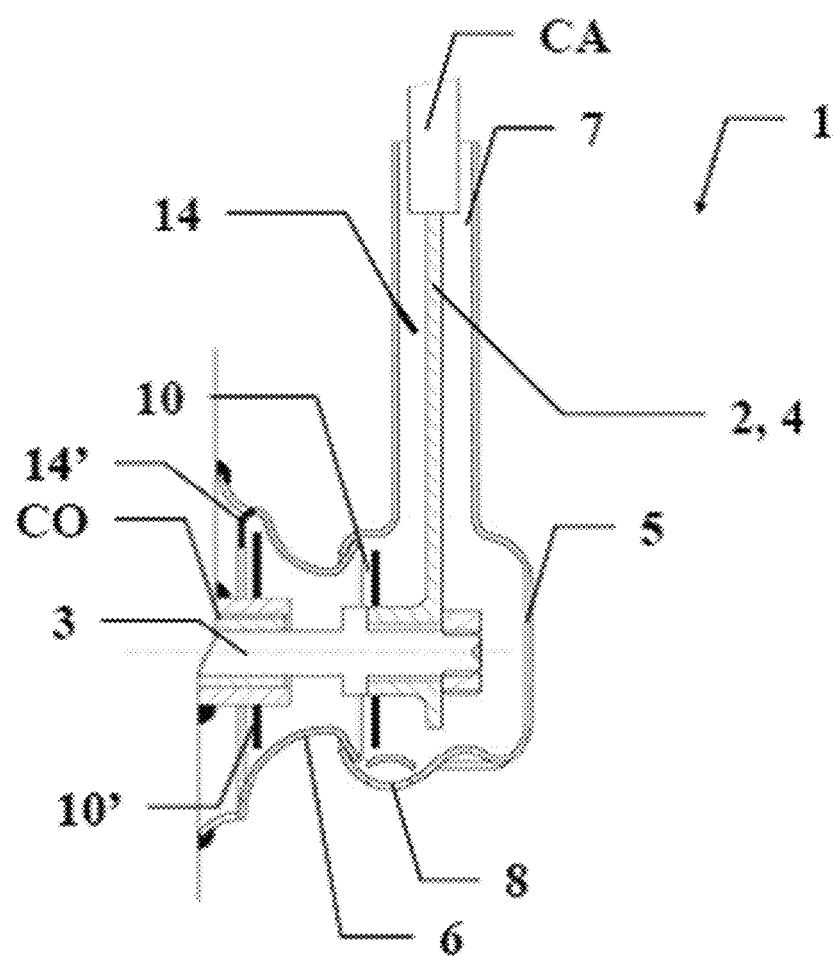
FIG. 4 shows, in sectional view, another protective cover according to the disclosure.

According to another embodiment, it may appear that the sealing cannot be properly achieved at the downstream end of the cap 5. In this case, more particularly illustrated in FIG. 4, the principle of the disclosure is again applied so as to divert a liquid, penetrating into the cap 5 by its downstream end, in order to prevent it from reaching the electrical insulator 21. For this purpose, as illustrated in FIG. 4, a protective cover 1 further comprises a second flange 10'. In order to protect it, from a liquid entry from downstream, the second flange 10' is arranged downstream of the electrical insulator 18. The second flange 10' prevents a liquid flowing along the downstream branch 3 from flowing upstream.

In order to stop a liquid flowing along the inner wall of the cap 5, more particularly in the downstream tube 6, the protective cover 1 advantageously also comprises a second deflector body 14'. The latter is arranged on the inner wall of the cap 5, in the downstream tube 6, preferably downstream of the second flange 10', so that a liquid diverted by the deflector flows downstream of the second flange 10'.

Such a protective cover 1 is designed to be arranged with the upstream tube 7 facing upward. However, it is clear that it can also be arranged according to any other orientation. Thus, such a protective cover 1 can be arranged according to any orientation, including an orientation where the upstream tube 7 faces upward with the cable CA descending toward the conductor 2 and potentially carrying the liquid.

The previously described protective cover 1 can be used to electrically protect a hot component, particularly when equipped with an electrical insulator 21 able to withstand high temperatures. Thus, it is particularly suitable for protecting an electrical connection of an electrode of an electrical heating element for an exhaust line.

Such an electric heating element or EHC (Electrically Heated Catalyst) usually presents in the form of a wafer arranged across an exhaust gas pipe, so as to be traversed by the flow of exhaust gas. As such, it is subjected to temperatures of up to 800° C. In addition, this heating element is itself a heat producer. It comprises at least one, or preferably two electrodes. Its function is to heat the exhaust gases and/or a downstream depollution equipment, mainly in the start-up phases when they are still cold. Such a depollution equipment can be a catalyst. Heating allows the catalyst to reach its optimal operating temperature.

The disclosure has been illustrated and described in detail in the drawings and the preceding description. The latter should be considered illustrative and given as an example and not as limiting the disclosure to this description alone. Many alternative embodiments are possible.

LIST OF REFERENCE SIGNS

1: protective cover,
2: conductor,
3: downstream branch,
4: upstream branch,
5: cap,
6: downstream tube,
7: upstream tube,
8: perforation,
9: inside contour of the downstream tube,
10, 10': flange,
14, 14': deflector body,
15: distal end of the deflector,
17: baffle,
18: area to be protected,
19: seal,
20: heating element,
21: electrical insulation,
CA: cable,
CO: complementary conductor

The invention claimed is:

1. A protective cover, for protecting an area to be protected against liquids, comprising:
   an electrical conductor comprising a downstream branch, able to be connected by a distal/downstream end to a complementary conductor, and an upstream branch, connected to the downstream branch by a proximal end and connected by a distal/upstream end to a cable;
   a substantially tubular cap surrounding the electrical conductor and the area to be protected against liquids, and wherein the substantially tubular cap comprises at least one perforation, located at a low point, and wherein the substantially tubular cap comprises a downstream tube substantially coaxial with the downstream branch and an upstream tube substantially coaxial with the upstream branch and connected with the downstream tube; and
   at least one deflector capable of diverting a liquid approaching the area to be protected against liquids toward said at least one perforation, and wherein the area to be protected against liquids comprises an electrical insulator arranged between the electrical conductor and the complementary conductor.

2. The protective cover according to claim 1, wherein the electrical insulator is arranged between the downstream branch of the electrical conductor and the complementary conductor.

3. The protective cover according to claim 1, wherein said at least one deflector comprises a deflector body, arranged on an inner wall of the substantially tubular cap, on a side of the area to be protected against liquids, and wherein the deflector body is arranged on the upstream tube or substantially at an intersection between the upstream tube and the downstream tube.

4. The protective cover according to claim 1, wherein said at least one perforation is protected by a baffle so as to oppose liquid entry from outside the substantially tubular cap.

5. The protective cover according to claim 1, wherein said at least one deflector comprises a first flange surrounding the electrical conductor, and further comprising a second flange, surrounding the complementary conductor.

6. An electrical heating element for an exhaust line, wherein at least one connection of one of a plurality of electrodes is protected by the protective cover according to claim 1.

7. The protective cover according to claim 1, wherein said at least one deflector comprises a flange surrounding the electrical conductor.

8. The protective cover according to claim 7, wherein the flange is arranged on the downstream branch.

9. The protective cover of claim 8, wherein the flange is arranged outside a gravity projection of the upstream tube.

10. The protective cover according to claim 1, wherein said at least one deflector comprises a deflector body, arranged on an inner wall of the substantially tubular cap, on a side of the area to be protected against liquids.

11. The protective cover according to claim 10, wherein said at least one deflector further comprises a flange surrounding the electrical conductor, and wherein the deflector body is sized so that a distal end of the deflector body projects, gravitationally, on an upstream side of the flange.

12. The protective cover according to claim 10, wherein the deflector body comprises a first deflector body, and further comprising a second deflector body arranged on the inner wall of the substantially tubular cap.

13. The protective cover according to claim 12, wherein the at least one deflector further comprises a first flange surrounding the electrical conductor and a second flange surrounding a complementary conductor, and wherein the second deflector body is arranged downstream of the second flange.

14. A protective cover, for protecting an area to be protected against liquids, comprising:
 an electrical conductor;
 a substantially tubular cap surrounding the electrical conductor and the area to be protected against liquids, and wherein the substantially tubular cap comprises at least one perforation, located at a low point;
 at least one deflector capable of diverting a liquid approaching the area to be protected against liquids toward said at least one perforation; and
 wherein said at least one perforation is protected by a baffle so as to oppose liquid entry from outside the substantially tubular cap.

15. An electrical heating element for an exhaust line, wherein at least one connection of one of a plurality of electrodes is protected by a protective cover for protecting an area to be protected against liquids, the protective cover comprising:
 an electrical conductor;
 a substantially tubular cap surrounding the electrical conductor and the area to be protected against liquids, and wherein the substantially tubular cap comprises at least one perforation, located at a low point; and
 at least one deflector capable of diverting a liquid approaching the area to be protected against liquids toward said at least one perforation.

* * * * *